United States Patent [19]

Breitweg et al.

[11] Patent Number: 5,195,559
[45] Date of Patent: Mar. 23, 1993

[54] ROTARY SLIDE VALVE FOR AUXILIARY-POWER STEERING DEVICES FOR MOTOR VEHICLES

[76] Inventors: Werner Breitweg; Rainer Schänzel, both c/o Zahnradfabrik Friedrichshafen AG, Postfach 25 20, D-7990 Friedrichshafen 1, Fed. Rep. of Germany

[21] Appl. No.: 654,616
[22] PCT Filed: Sep. 12, 1989
[86] PCT No.: PCT/EP89/01056
  § 371 Date: Feb. 21, 1991
  § 102(e) Date: Feb. 21, 1991
[87] PCT Pub. No.: WO90/03295
  PCT Pub. Date: Apr. 5, 1990

[30] Foreign Application Priority Data

Sep. 17, 1988 [DE] Fed. Rep. of Germany ....... 3831728

[51] Int. Cl.⁵ .............................................. B62D 5/083
[52] U.S. Cl. .......................... 137/625.23; 137/625.2 X; 91/375 A
[58] Field of Search ....................... 137/625.23, 625.24, 137/625.17; 91/375, 375 A

[56] References Cited

U.S. PATENT DOCUMENTS

| | | | |
|---|---|---|---|
| 3,867,075 | 2/1975 | Horst | 137/625.17 X |
| 4,106,883 | 8/1978 | Hansen | 137/625.24 X |
| 4,561,516 | 12/1985 | Bishop | 137/625.17 X |
| 4,858,712 | 8/1989 | Neff | 137/625.17 X |

FOREIGN PATENT DOCUMENTS

| | | |
|---|---|---|
| 3303063 | 8/1984 | Fed. Rep. of Germany . |
| 3413072 | 10/1984 | Fed. Rep. of Germany . |
| 2448670 | 9/1980 | France . |
| 88/01958 | 3/1988 | PCT Int'l Appl. . |
| 1308992 | 3/1973 | United Kingdom . |

*Primary Examiner*—Alan Cohan
*Attorney, Agent, or Firm*—Albert M. Zalkind

[57] ABSTRACT

A rotary slide valve, especially for auxiliary-power steering devices for motor vehicles, has a rotary slide (2) rotatable opposite a control bushing (1). The control bushing (1) and the rotary slide (2) have guiding longitudinal grooves (3, 4, 7, 8) that work together for directing a pressure agent from a pressure agent source to and from a servomotor. Guiding edges (5 and 10 and 6 and 11) of the guiding longitudinal grooves (3, 4, 7, 8) of the control bushing (1) and the rotary slide (2), working together, are placed parallel with each other. The guiding edges (5, 6) of the guiding longitudinal grooves (3, 4) of the control bushing (1) and the guiding edges (10, 11) of the rotary slide (2) are positioned conically with respect to each other longitudinally.

The rotary slide valve is assembled in such a way that the control bushing (1) and the rotary slide (2) are first pushed axially, in relation to each other, into a position in which the characteristic curve of the valve assumes its ideal position in the field of tolerance of the valve's characteristic curve and that the control bushing (1) and the rotary slide (2) then are fastened in their respective axial positions.

8 Claims, 1 Drawing Sheet

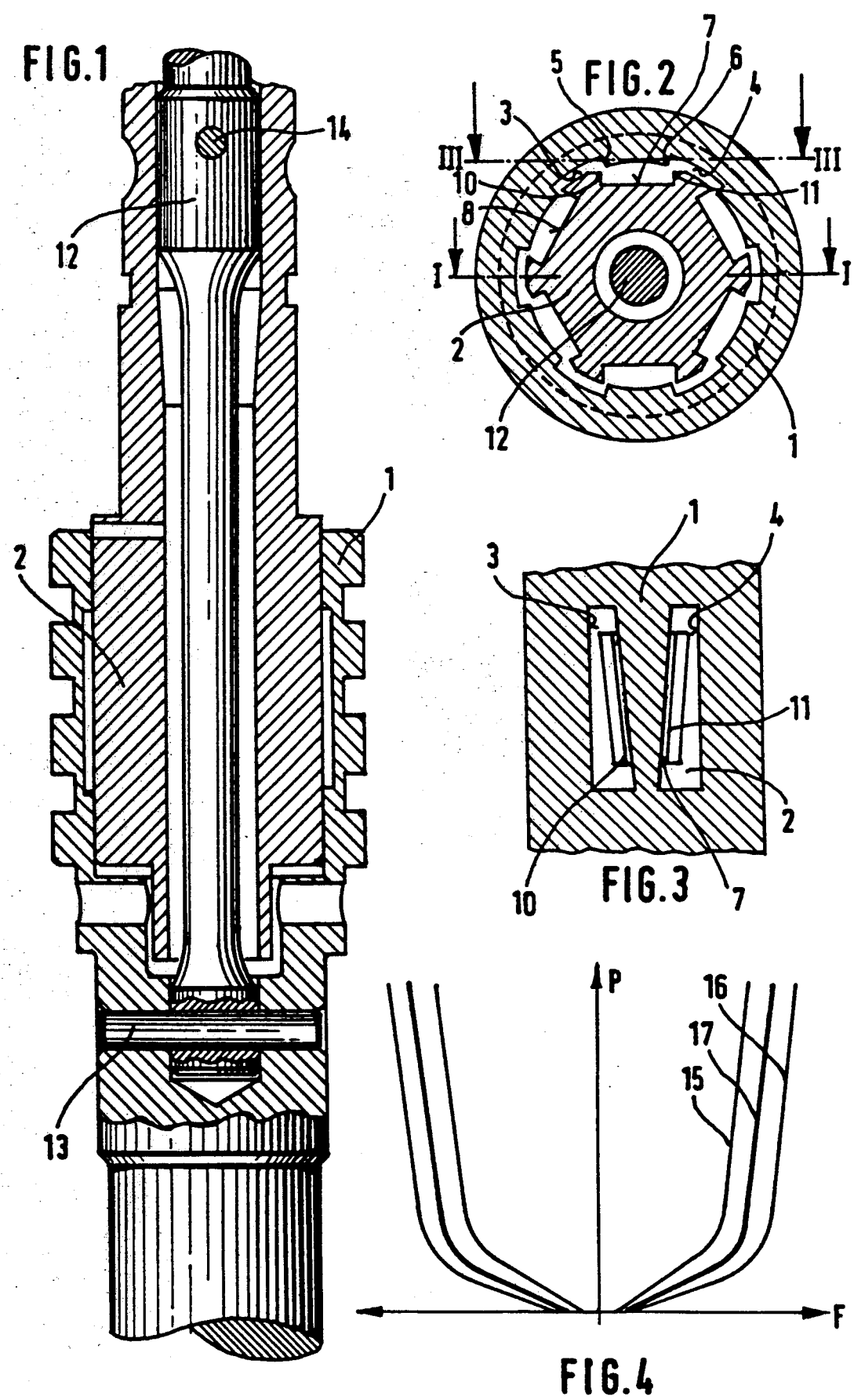

ROTARY SLIDE VALVE FOR AUXILIARY-POWER STEERING DEVICES FOR MOTOR VEHICLES

The invention is concerned with a rotary slide valve, especially for auxiliary-power steering devices for motor vehicles, with a rotary slide that is rotatable opposite a control bushing. A pressure agent is directed from a pressure agent source to and from a servomotor with such a rotary slide valve. For that purpose, the control bushing and the rotary slide have longitudinal grooves that work together. The guiding edges of the guiding longitudinal grooves of the control bushing and the rotary slide, working together, are always placed parallel with each other. Such a rotary slide valve is known from DE-PS 33 03 063.

In such a rotary slide valve, certain tolerances in the width of the guiding grooves of the control bushing and the rotary slide and the dividing of the guiding edges occur in the usual manufacturing processes. Therefore, in the completely assembled rotary slide valves, the valve characteristic curves lie within a field of tolerance whose width does not satisfy the desire for uniform, even steering.

The object of the invention is to improve a known rotary slide valve so that the width of the valve's characteristic curve's field of tolerance is reduced to a minimum. Simple manufacturing and assembling processes are to be used in accomplishing that object.

The achievement of the object consists, above all, in positioning the guiding edges of the guiding longitudinal grooves of the control bushing and the rotary slide conically with respect to each other longitudinally. In assembling control bushings and rotary slides made to be placed in that way, they are first pushed axially, in relation to each other, into a position in which the valve's characteristic curve occupies a certain position in the field of tolerance of the valve's characteristic curve. Then the control bushing and the servo-piston are fastened in their axial positions.

If the control bushing and the rotary slide are centered on each other by a torque rod, the two parts are fastened together firmly over the torque rod after their exact axial position has been located. This is accomplished by drilling holes in the control bushing and the rotary slide and pinning them to the torque rod.

It is desirable for the guiding grooves of the control bushing to be manufactured by a non-cutting process, such as cold extrusion or round kneading. However, a final processing by grinding is also possible.

By means of the construction of the two parts of the rotary slide valve according to the invention and the assembling process, rotary slide valves can be produced whose valve characteristic curves lie within a very narrowly limited field of tolerance.

In the following, the invention is described in greater detail with the help of an embodiment that is shown in the drawings.

FIG. 1 shows the longitudinal section through the rotary slide valve of the invention along the line I—I in FIG. 2.

FIG. 2 shows a cross section through the rotary slide valve of FIG. 1.

FIG. 3 shows a partial longitudinal section along the line III—III in FIG. 2.

FIG. 4 shows a valve's characteristic curve with the field of tolerance.

The rotary slide valve consists essentially of a control bushing 1 in which a rotary slide 2 is carried rotatably. The control bushing 1 has guiding longitudinal grooves 3 and 4 in its interior that are provided with guiding edges 5 and 6. The guiding longitudinal grooves 3 and 4 are connected with the two surge chambers of a servomotor (not shown).

The rotary slide valve 2 has guiding longitudinal grooves 7 and 8 that are connected with a power-steering pump (not shown) and a tank (not shown). The guiding longitudinal grooves 7 are provided with guiding edges 10 and 11 that work with the guiding edges 5 and 6. The guiding edges 10 and 11 are provided with guiding chamfers with which a certain shape of the valve characteristic curve of the rotary slide valve can be obtained.

The guiding edges 5 and 6 of the guiding longitudinal grooves 3 and 4 of the control bushing 1 run to each other conically. The guiding edges 10 and 11 of the guiding longitudinal groove 7 of the rotary slide 2 also run to each other conically. The guiding edge 5 of the control bushing 1 and the guiding edge 10 of the rotary slide 2 are placed parallel to each other. The guiding edge 6 of the control bushing 1 is also placed parallel to the guiding edge 11 of the rotary slide 2.

It is desirable for the guiding longitudinal grooves 3 and 4 of the control bushing 1 to be produced in a non-cutting cold forming technical process. That is possible by cold extrusion or round kneading, for example. The guiding longitudinal grooves 7 and 8 of the rotary slide 2 can also be produced in a non-cutting manner.

The rotary slide 2 is centered in the control bushing 1 by a torque rod 12. The torque rod 12 is always fastened, rotation-resistantly, to the control bushing 1 and the rotary slide 2 at one of its ends. The connection is made with pins 13 and 14, for example.

In a diagram in FIG. 4, the working pressure p of an auxiliary-power steering device is applied by means of the power F at the steering wheel. In auxiliary-power steering devices known up to the present, the field of tolerance of the valve's characteristic curve lies between the lines 15 and 16. A valve characteristic curve of 17 is ideal. To obtain that valve characteristic curve, the rotary slide valve is assembled by the following process:

The rotary slide 2 is first pushed axially in the control bushing into a position in which the valve's characteristic curve occupies its ideal position in the field of tolerance. Then the rotary slide in the control bushing is fastened in its axial position. The fixing of the axial position is accomplished by connecting the control bushing 1 and the rotary slide 2 firmly to the torque rod 12. That is accomplished by connecting the control bushing 1 and/or the rotary slide 2 with the ends of the torque rod 12 by the pins 13 and 14 passing through drilled holes, for example. However, it is also possible to connect either the control bushing 1 or the rotary slide 2 firmly with an end of the torque rod 12 before assembly is performed. That can be accomplished by rolling into a groove toothing or by another secure connection, for example.

We claim:

1. In a rotary valve for auxiliary-power steering devices for motor vehicles including a control sleeve (1) having a rotary member (2) arranged therein, the sleeve and member having opposed cylindrical surfaces containing a plurality of longitudinal grooves (3, 4, 7, 8) which cooperate to direct a pressure agent from a pressure source to a servomotor, the opposed cylindrical surfaces having guide edges (5, 6, 10, 11) along the grooves, the opposed guide edges of the sleeve and member being arranged parallel to each other, the improvement which comprises
the guide edges of the longitudinal grooves of the rotary member are connected with the pressure source and are arranged obliquely to each other at the same angle with respect to a longitudinal axis of the valve.

2. A rotary valve as defined in claim 1, wherein the longitudinal grooves of the bushing are produced by a manufacturing process other than cutting.

3. A method for assembling a rotary valve for auxiliary power steering devices for motor vehicles including a control sleeve (1) having a rotary member (2) arranged thereon, the sleeve and member having opposed cylindrical surfaces containing a plurality of longitudinal grooves (3, 4, 7, 8) which cooperate to direct a pressure agent from a pressure source to a servomotor, the opposed cylindrical surfaces having guide edges (5, 6, 10, 11) along the grooves, the opposed guide edges of the sleeve and member being arranged parallel to each other, comprising the steps of
(a) forming the guide edges of the longitudinal grooves of the rotary member so that they are arranged obliquely to each other at the same angle with respect to a longitudinal axis of the valve;
(b) positioning and fixing the sleeve and the rotary member axially with respect to each other so that the valve's characteristic curve (17) occupies a certain position in the valve's field of tolerance; and
(c) connecting the longitudinal grooves of the rotary member to the pressure source.

4. A method as defined in claim 3, wherein the longitudinal grooves of the control bushing are formed by one of cold extrusion and round kneading.

5. In a rotary valve for auxiliary-power steering devices for motor vehicles including a control sleeve (1) having a rotary member (2) arranged therein, the sleeve and member having opposed cylindrical surfaces containing a plurality of longitudinal grooves (3, 4, 7, 8) which cooperate to direct a pressure agent from a pressure source to a servomotor, the opposed cylindrical surfaces having guide edges (5, 6, 10, 11) along the grooves, the opposed guide edges of the sleeve and member being arranged parallel to each other, the improvement comprising
(a) the guide edges of the longitudinal grooves of the rotary member being connected with the pressure source and being arranged obliquely to each other at the same angle with respect to a longitudinal axis of the valve; and
(b) means for fastening the rotary member and sleeve in relative axial positions wherein a characteristic curve of the valve falls within a field of tolerance.

6. A rotary valve as defined in claim 5, wherein said fastening means comprises an axial torque rod (12) for centering the control sleeve and the rotary member.

7. A rotary valve as defined in claim 6, wherein said fastening means further comprises pins (13, 14) connecting the ends of said torque rod with the member and sleeve, respectively.

8. A rotary valve as defined in claim 7, wherein the longitudinal grooves of the sleeve are produced by a manufacturing process other than cutting.

* * * * *